April 13, 1965 A. H. SHAPIRO 3,178,719

MAGNETIC DISC

Filed July 20, 1961

INVENTOR.
ASCHER H. SHAPIRO

BY

ATTORNEY

United States Patent Office 3,178,719

Patented Apr. 13, 1965

3,178,719
MAGNETIC DISC

Ascher H. Shapiro, Arlington, Mass., assignor to Laboratory for Electronics, Inc., Boston, Mass., a corporation of Delaware Filed July 20, 1961, Ser. No. 125,516
2 Claims. (Cl. 346—74)

Figures 1, 2:
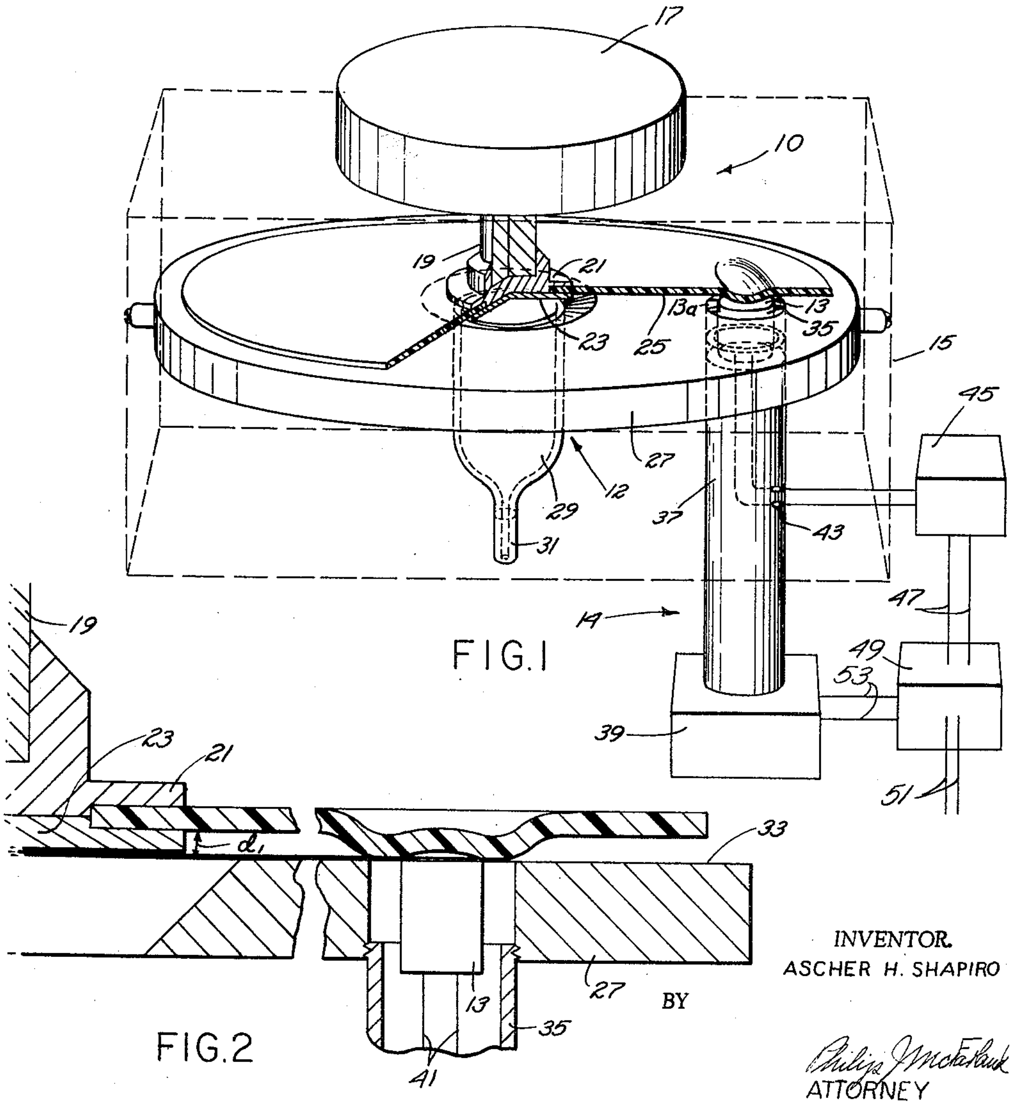

This invention relates generally to data processing apparatus and particularly to a magnetic recording device for recording, storing and retrieving information.

It has been known for some years that so-called "non-contacting" magnetic recording techniques (wherein there is no direct physical contact between a magnetic recording medium and the magnetic transducers associated therewith) must be used if certain types of information, as high frequency or wide-band signals, are to be satisfactorily processed. Among the types of magnetic recorders incorporating non-contacting recording techniques are those recorders which utilize a "pliant" recording disc.

An example of a pliant disc recorder is illustrated in U.S. Patent #2,950,353. In a recorder of the type described in the cited patent, a pliant recording disc is rotated in a fluid, as air, about a predetermined axis and in proximity with an annular plate. A combination of centrifugal forces and so-called "Bernoulli" forces produced by rotation of the disc cause the disc to reach a condition of equilibrium in which the peripheral portions of the disc are closely spaced from the annular plate. Recording may then be accomplished if a magnetic transducer is disposed flush with the surface of the annular plate opposite to the peripheral portions of the disc.

In other types of recorders (as those illustrated and described in the pending U.S. applications for patent, Serial Nos. 853,373, now abandoned, and 25,995, now Patent No. 3,110,889, filed November 16, 1959 and May 2, 1960, respectively, are assigned to the same assignee as this application) positioning of a flexible recording disc is attained when an equilibrium condition is reached between the centrifugal, fluid and elastic forces operating on such a disc. According to the first cited application, any desired equilibrium condition may be attained by regulating the initial pressure of the fluid moving between the flexible disc and a stabilizing plate so as to balance the fixed stresses and bending moments in the particular flexible disc being used. According to the latter application, the equilibrium condition is attained by regulating the fluid pressure gradient radially in the space between the flexible disc and the stabilizing plate to balance the fixed stresses and bending moments in the particular flexible disc being used. In either case, the result of regulation of the fluid pressure is that the cross-sectional shape of the disc is changed so that a sufficiently small separation between the stabilizing plate and at least half the area of the disc exists. Consequently, the efficiency of a flexible disc as a magnetic storage medium is very greatly increased.

Another approach to the solution of the problem is described in my co-pending application Serial No. 97,304, filed March 21, 1961 and entitled "Magnetic Disc Storage Device." According to the teachings the just-cited reference, the positioning of a flexible magnetic disc may be adjusted in operation to minimize signal fluctuations. The required adjustment is obtained by rotating a flexible disc adjacent to a stabilizing plate and then controlling the fluid forces acting on the side of the disc removed from such a plate in accordance with a signal proportional to the amplitude of a reference signal so as to force the disc to assume the desired shape.

Although the cited approaches to the problem have proven worthwhile, experience has proven that more efficient operation may be attained by arranging the control means to obtain localized deflections and deformation of the flexible disc. In this mode of operation, the amount of power required is significantly less than in other known modes and, at the same time, critical spacings may be more closely held.

Therefore, it is an object of this invention to provide an improved magnetic recorder utilizing automatic local control of transducer-to-recording medium separation;

Another object of the invention is to provide an improved magnetic recorder of such a design that far less power is required for operation than is required for known magnetic recorders;

Still another object of the invention is to provide an improved magnetic recorder of the "non-contacting" type in which critical spacing between a magnetic transducer and a recording medium is held independently of the spacing between such recording medium and other elements in the recorder.

These and other objects of the invention are attained generally by providing a magnetic recorder in which a flexible recording disc is rotated in a fluid, as air, adjacent to a stabilizing plate whereby dynamic and fluid forces are generated to cause, in combination with the inherent elastic forces in the flexible recording disc, the body of such disc to assume a stable position at a fixed distance from the stabilizing plate, embedding a plurality of magnetic transducers in the stabilizing plate and independently deforming small areas of the flexible disc adjacent to each one of the magnetic transducers by creating a partial vacuum around each one of the magnetic transducers to obtain the desired localized small spacing near each magnetic transducer.

For a more complete understanding of the invention, reference is now made to the following detailed description of a preferred embodiment of the invention and to the accompanying drawings, in which:

FIG. 1 is an isometric view, greatly exaggerated and partially in phantom, of a magnetic recorder and its associated control equipment incorporating the principles of the invention; and FIG. 2 is a partial cross-section of the portion of the magnetic recorder of FIG. 1 adjacent to the recording/reading head shown in FIGURE 1.

Referring now to FIG. 1, it may be seen that a preferred embodiment of invention consists generally of a rotating flexible disc memory assembly 10, a disc stabilizing assembly 12, a magnetic transducer 13, and a magnetic gap regulating assembly 14 supported in operative relationship one to the other in and on an enclosure 15 (indicated in broken lines).

The rotating flexible disc memory assembly 10 includes: a driving unit 17, as a synchronous electric motor, mounted in any desired known manner on the outside of the enclosure 15; a shaft 19 integrally attached to the rotor (not shown) of the driving unit 17 and extending through a journal bearing (not shown) in the enclosure 15; an upper flange 21 and a lower flange 23 mounted near the lower end of the shaft 19; and a flexible magnetic disc 25 clamped between the opposing surfaces of the upper flange 21 and the lower flange 23. It is obvious now that, absent any other structure, if the driving unit 17 is excited, the flexible magnetic disc 25 theoretically will be caused to assume the shape of a surface of revolution. The particular shape assumed by the flexible disc 25 in such a "free rotation" mode is, of course, dependent upon many factors. For example, speed of rotation, orientation of the flexible disc 25 with respect to the earth's gravitational field, the flexibility of the material making up the flexible disc 25 the condition of the environment in which the flexible disc 25 is moving, the mechanical condition of the flexible disc (especially the condition of the peripheral portions thereof) and the amount of wobble or runout of all the rotating elements all combine to determine the particular cross-sectional shape assumed by the flexible disc 25 in its "free rotation" mode. Experience has proven that it is almost impossible, when the flexible disc 25 is fabricated from a thermoplastic material (as that known in the art as "Mylar" produced by the Du Pont Company) in the order of .002" thick and supporting a ferromagnetic film, to control each and every one of the variables so as to predict the shape of the flexible disc 25 in its "free rotation" mode. In fact, it has been found that cyclically and randomly occurring variations prevent attainment of stable conditions in which the flexible disc 25 will form a fixed surface of revolution. In other words the "free rotation" mode is impractical, since, if the magnitudes of the cyclic or random forces acting on the flexible disc 25 in its "free rotation" mode are to be kept below the magnitude of the forces which cause the flexible disc to tear itself apart, the speed of rotation of the flexible disc 25 must be as low as the speeds used in contact recording.

The disc stabilizing assembly 12, consisting of a flat plate 27 (if it is desired to cause the flexible disc 25 to rotate essentially in a plane), a manifold 29 and a throttling aperture 31, serves to minimize the effect of cyclic and random variations in the different parameters affecting the cross-sectional shape of the flexible disc 25 in its "free rotation" mode. In the illustrated case, an upper surface 33 (shown more clearly in FIG. 2) of the flat plate 27 is disposed perpendicular to the axis of rotation of the flexible disc 25. The initial spacing (indicated by the symbol "*d*," in FIG. 2) between the flexible disc 25 and the upper surface 33, although variable within wide limits, preferably is maintained at approximately .005" to .010". When the flexible disc 25 is rotated adjacent the stabilizing plate 27 (sometimes referred to as the flat plate) in a gaseous atmosphere, as air, a radial fluid pressure gradient is built up in the space defined by the flexible disc 25 and the upper surface 33 in a manner described in the U.S. patent application of Robert T. Pearson et al., Serial No. 97,987, filed March 21, 1961, and assigned to the same assignee as the assignee of this application. Briefly an equilibrium condition is set up wherein the dynamic, fluid and elastic forces acting on the flexible disc 25 are balanced to cause the flexible disc to rotate so as to form a surface of revolution which is affected very little by changes in any of the parameters which are so critical in the "free rotation" mode.

It will be observed, however that, for a given flexible disc used with a given stabilizing assembly, the flexible disc tends to form one and one only surface of revolution, spaced a small distance from the upper surface 33 of the flat plate 27. In other words, rotation of a flexible disc in what may be called the "stabilized" mode eliminates, for almost all practical purposes, the problems encountered in the "free rotation" mode at the cost of eliminating, or at least making difficult, any adjustment of gap spacing in operation. Such adjustment is highly desirable since uncontrollable variations, as variation in thickness or flexibility of the flexible disc 25, make it mandatory that all controllable parameters be held within very close limits if operation in the "stabilized" mode is to be satisfactory.

It follows, in the light of the foregoing, that a still different mode of operation, hereinafter referred to as the "regulated" mode of operation or simply the "regulated" mode is highly desirable. That is, means should be provided to allow precise and accurate spacing during operation between any one of a plurality of magnetic transducers and the flexible disc, regardless of the radial position of each one of the magnetic transducers. It has been found that the illustrated magnetic gap regulating assembly 14 is an efficient and simple mechanism to provide such a function with a single magnetic transducer.

The magnetic gap regulating assembly 14 comprises an annular opening 35 leading through the flat plate 27 and connecting the space between the upper surface 33 of the flat plate 27 and the flexible disc 25 to a pipe 37. The lower end of the pipe 37 in turn is connected to a vacuum pump 39. The magnetic transducer 13 is mounted in the opening 35, being held in place in any convenient manner, as by epoxy or non-magnetic bridges 13*a* so as to be, preferably, flush with the upper surface 33 of the flat plate 27. It should be noted in passing, however, that it is not essential to the invention that the magnetic transducer 13 be flush with the upper surface 33. That is, the magnetic transducer 13 may project above or be recessed below the upper surface 33 an appreciable distance (meaning in the order of up to .002"). Further, it should be noted that it is not necessary that the end of the magnetic transducer 13 be parallel to the upper surface 33, an appreciable skew angle between the elements be permissible. The energizing leads 41 (shown as two broken lines within the pipe 37) are led through a terminal 43 affixed to the pipe 37 to a read/write amplifier 45 of any known type. When the read/write amplifier 45 is used to read a signal stored in the flexible disc 25, leads 47 conduct an electric signal proportional to the amplitude of the signal output of the magnetic transducer 13 to a comparator/controller 49, which element also may be any one of the many known types of such devices. A reference signal preferably is fed into comparator/controller 49 on leads 51 from a standard source (not shown). The output of the comparator/controller 49, which output obviously is proportional to the difference in amplitude between the signal output of the magnetic transducer 13 and the reference signal, is conducted by leads 53 to control operation of vacuum pump 39.

The foregoing just described structure constitutes a servo system by means of which the fluid pressure adjacent the magnetic transducer 13 may be adjusted while the flexible disc 25 is rotating. Consequently, a perturbation in the fluid pressure gradient radially of the flexible disc 25 may be generated, whereby the equilibrium conditions governing the shape of the flexible disc 25 suddenly are changed. It is evident, therefore, that the direction and the distance which the flexible disc 25 moves may be regulated by the partial vacuum pulled by the vacuum pump 39 which is controlled in accordance with the amplitude of the signal detected by the magnetic transducer 13.

It will be noted that a characteristic of the just-described "regulated" mode of operation is the existence of a localized depression of the flexible disc 25 in the neighborhood of transducer 13. Since the flexibility of the preferred type of flexible disc is very great, many transducers may be spirally disposed in the flat plate 27 in a known manner and regulated without any significant interaction between individual regulating assemblies.

Many variations of the preferred embodiment of the invention will be apparent to those having skill in the art. It is intended, therefore, that the invention not be limited by the scope of the illustrated embodiment thereof, but rather by the spirit and scope of the appended claims.

What is claimed is:

1. Magnetic recording apparatus utilizing a flexible recording disc rotating in a fluid adjacent to and out of contact with a magnetic transducer embedded in a stabilizing plate and including, regulating means to maintain a predetermined spacing between the magnetic transducer and that portion of the flexible recording disc adjacent thereto, the regulating means comprising a vacuum pump, means for connecting the vacuum pump through an opening in the stabilizing plate surrounding the magnetic transducer and means for controlling the partial vacuum drawn by the vacuum pump in the space adjacent to the magnetic transducer in accordance with the amplitude of the electric signal output thereof to deform the flexible recording disc.

2. A magnetic recorder utilizing a flexible recording disc and a plurality of magnetic transducers in a fluid, each one of the magnetic transducers being radially disposed with respect to the flexible recording disc and supported in a stabilizing plate, comprising, means for rotating the flexible recording disc to establish a radial fluid pressure gradient in the space defined by the surface of the stabilizing plate and the opposing surface of the flexible recording disc, means operative through the stabilizing plate to create perturbations in such radial fluid pressure gradient around each one of the magnetic transducers which perturbations cause the flexible recording disc to be deformed, and means for adjusting independently each one of such perturbations to adjust the spacing between each one of the magnetic transducers and the portions of the flexible recording disc opposing each one of the magnetic transducers in accordance with the electric signal output of each one of the magnetic transducers.

References Cited by the Examiner

UNITED STATES PATENTS

| | | | |
|---|---|---|---|
| 2,905,768 | 9/59 | Cronquist | 179—100.2 |
| 2,950,353 | 8/60 | Fomenko | 179—100.2 |

FOREIGN PATENTS

| | | |
|---|---|---|
| 758,865 | 10/56 | Great Britain. |

IRVING L. SRAGOW, *Primary Examiner.*

ELI J. SAX, *Examiner.*